Aug. 21, 1956     H. GOLDSCHMIDT     2,759,503
WORK HOLDING AND FEEDING DEVICE FOR USE WITH TABLE SAWS
Filed April 30, 1954     2 Sheets-Sheet 1
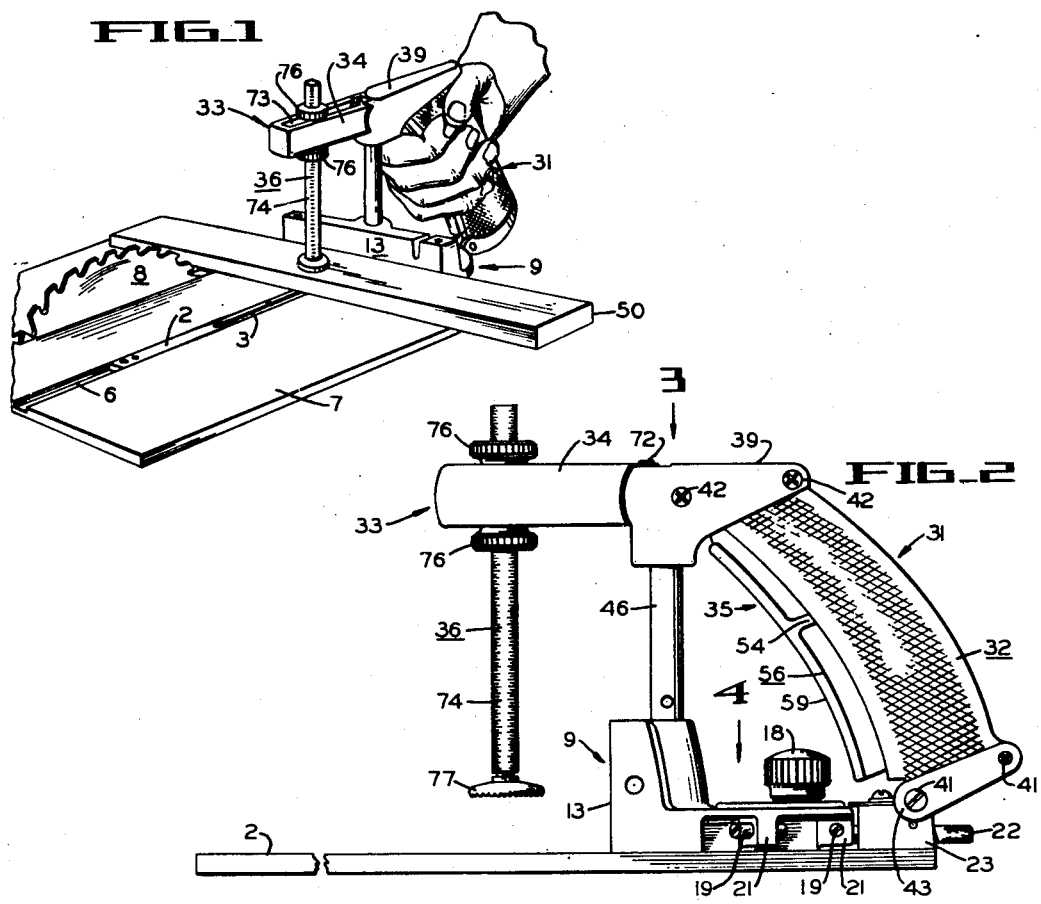
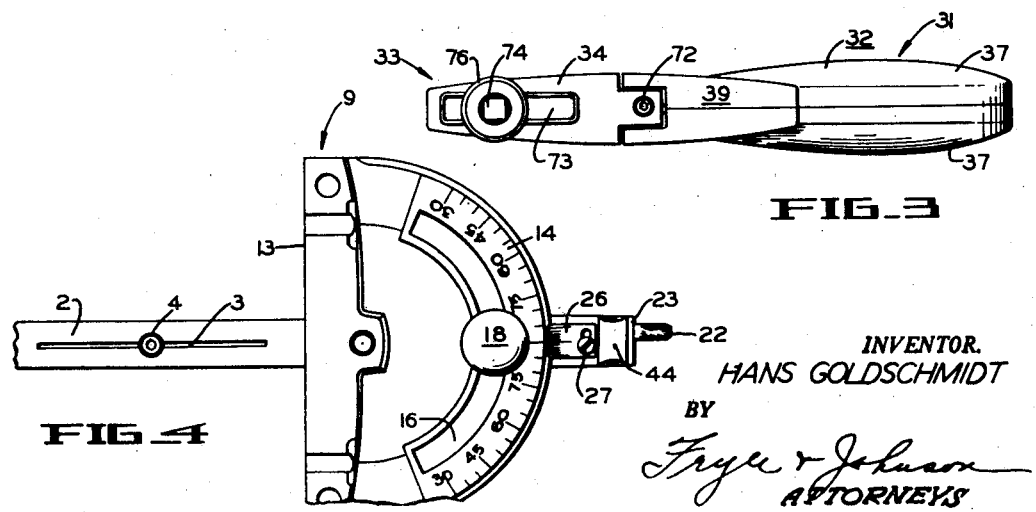
INVENTOR.
HANS GOLDSCHMIDT
BY
*Fryer & Johnson*
ATTORNEYS

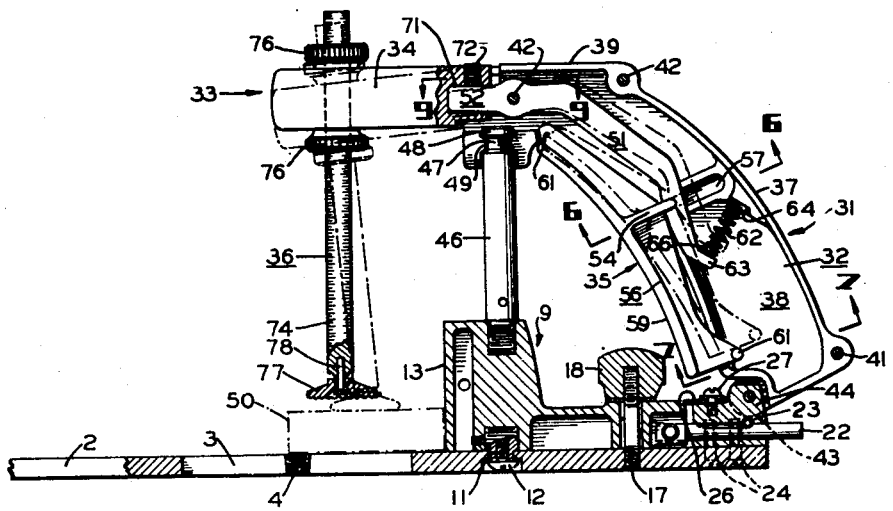

United States Patent Office 2,759,503
Patented Aug. 21, 1956

2,759,503
WORK HOLDING AND FEEDING DEVICE FOR USE WITH TABLE SAWS

Hans Goldschmidt, Atherton, Calif., assignor to Magna Power Tool Corporation, a corporation of California Application April 30, 1954, Serial No. 426,660

11 Claims. (Cl. 143—51)

This invention relates to a work holding device, and more particularly to a work clamping mechanism especially adapted for mounting on a miter gage frequently employed in conjunction with cutting tools such as circular saws, band saws, sanders and grinding discs. However, the invention may be employed for the holding or clamping of any type of work irrespective of the operation intended to be performed on such work.

With respect to cutting tools, such as a circular saw, in which work such as lumber is moved along a work table past the rotating saw which cuts the same and with which a miter gage is often employed for positioning the work at a desired cutting angle, it is the prevalent practice for the operator to hold the work against a work abutment face of the miter gage, by means of his two hands positioned at one side of the cutting tool. Such manual holding of the work with two hands presents safety hazards. Furthermore, it is not conducive to accuracy because of the development of a certain amount of so-called "creep" toward the tool, with the result that the work is not cut square, or is cut at an angle off one or two degrees.

Although work hold-down or clamping mechanisms have been provided in the past for clamping the work, in an attempt to overcome the objections to holding the work with two hands, they have not been all to be desired and consequently have not met with popular use. This is so because they cannot be set up quickly and easily or adjusted rapidly, operated quickly, and they do not present the ultimate in safety and accuracy. This invention is designed to overcome the problems related.

Summarizing the invention, the work holding device comprises a hand grip part, work clamping means movably connected to the hand grip part, and actuating means associated with the grip part and connected to the clamping means for moving the clamping means into clamping position against the work; the grip part and clamp actuating means being adapted to be held and operated with with one hand so as to leave the other hand, usually the left hand, free for holding the work.

The clamping means includes elements that can be quickly adjusted to position a work engaging element of the clamping means a short distance above the work to be cut; and the clamp actuating means is of such character as to bring the work engaging element in contact with the work by mere squeezing of a hand on the grip part. Thus, when the device is fixedly supported on a conventional miter gage, the work can be held down in fixed position by gripping of the grip part with the hand; and both the hold-down device and the miter gage are operated by the one hand as such combination of devices is pushed toward the operating tool by the hand.

Also, the clamp actuating means is so constructed that when the work is cut, automatic release of the work clamping means can be effected by mere release of the clamp actuating means by the hand. Hence, when cutting off a plurality of successive smaller pieces from the same piece of work or operating on another piece of work of substantially the same thickness, the operation of shifting the work to be cut into smaller pieces or replacement with a new piece of work may be quickly and easily performed without the necessity of having to make any adjustment for releasing the work, and readjustments for clamping the work. As a result of the described arrangement, there is great safety for the operator because having merely to hold one hand on the grip part during the working operation, his other hand is free to hold the work at a position remote from the operating tool. In addition, the support arrangement of the device on the miter gage is such that there is substantially no creeping of the work, thus providing great accuracy in the work operation.

From the preceding summary, it is seen that this invention has as its objects, among others, the provision of an improved, simple and economical one hand operable work holding device particularly adapted for use in conjunction with an instrument such as a miter gage, and which provides great safety in operation, requires substantially no adjustment thereof to place it in operation, will not cause creeping of the work to thus insure accurate operation on the work, and which is easy to operate. Other objects of the invention will become apparent from the following more detailed description in which reference is made to the accompanying drawings.

In the drawings:

Fig. 1 is an isometric view illustrating the work holding device of the invention operated with one hand in conjunction with a miter gage slidably mounted on the work table of a rotary saw tool.

Fig. 2 is a side elevational view of the device mounted on a miter gage which provides a supporting base structure therefor; the customary miter gage bar being broken away to shorten the view.

Fig. 3 is a top plan view looking in the direction of arrow 3 in Fig. 2 with the miter gage omitted from the view.

Fig. 4 is a top plan view of the miter gage looking in the direction of arrow 4 in Fig. 2; an end portion of the miter gage bar being omitted from the view and a portion of the miter gage protractor body being omitted to shorten the view.

Fig. 5 is a longitudinal sectional elevation of the device mounted on the miter gage, with an end portion of the miter gage bar omitted to shorten the view. The broken lines illustrate the movable clamping means of the device, the actuating means therefor and the work in work clamping position.

Fig. 6 is a transverse section across the handle portion of the grip part of the device, looking in the direction and taken in a plane indicated by line 6—6 in Fig. 5.

Fig. 7 is a similar view, looking in the direction and taken in a plane indicated by line 7—7 in Fig. 5.

Fig. 8 is a fragmentary longitudinal sectional view at the bottom of the means adapted to engage the work, illustrating the mounting of a work press shoe employed for such purpose.

Fig. 9 is a fragmentary horizontal section, looking in the direction and taken in a plane indicated by line 9—9 in Fig. 5.

As previously related, the hold-down device hereof is of general applicability but is particularly cooperable with a miter gage. The miter gage is of more or less conventional construction and comprises the usual miter gage bar 2 provided with longitudinally extending slot 3 cooperable with screw 4 providing adjustment for accurate sliding fit of the bar in guideway 6 of a tool work table 7. A circular saw 8 is shown for purposes of illustration as the work operating tool but, as previously related, other operating tools may be employed.

The usual protractor body 9 of the miter gage is pivotally mounted for turning movement on bar 2 by means of a collar 11 fixed in the underside of body 9 and which is journalled in bar 2, as is illustrated in Fig. 5. Collar 11 is internally threaded; and a screw 12 detachably holds the parts together while at the same time allows free turning of body 9 on bar 2.

At its front, body 9 has transverse, accurately machined and flat, vertical work abutment face 13 against which the work is held; and the rear part of body 9 is provided with the usual protractor scale 14 and with arcuate slot 16 adjacent such scale. A stud 17 fixed to bar 2 extends through slot 16; and a knurled nut 18 is screwed on stud 17 to clamp protractor body 9 at any predetermined angular position depending on the angle at which it is desired to cut the work.

Customary means is employed on the gage for determining fixed stop positions wherein abutment face 13 is at 90° and 45° angles with respect to the longitudinal center line of bar 2. Such stop means comprises adjustable set screws 19 mounted in bosses 21 extending from the underface of protractor body 9 in an arcuate recess at such underface, and which are cooperable with a longitudinally movable stop pin 22 slidably mounted in a pedestal 23 fixedly but detachably secured to the rear end of bar 2 by screws 24. On the top face of pedestal 23 is an index plate 26 cooperable with protractor scale 14; the index plate being held in adjusted position by a set screw 27 which passes through an elongated slot in plate 26.

The work holding device is detachably mounted on the described type of miter gage which thus provides a supporting base structure therefor. Such work holding device comprises the following main parts. A hand grip part 31 having a pistol-like handle portion 32 arcuately shaped to conform to a hand gripping the same, and extending upwardly from and mounted on pedestal 23; a work clamping part 33 movably connected to grip part 31 at the front upper end thereof for up and down movement in an upright direction, and including detachably mounted clamping arm 34, and work engaging means 36 adjustably mounted on such arm for both longitudinal and vertical movement with respect thereto; and automatically releasable actuating means 35 associated with grip part 31 and connected to work clamping part 33 to move the same. Actuating means 35 is operable by the hand engaging handle portion 32, and is automatically releasable upon release of such hand.

Grip part 31 comprises right and left hand mating sections 37 which form a hollow interior 38, and provide a horizontal forwardly extending top portion 39 at the upper end of handle portion 32; the mating sections 37 being detachably held together by a pair of lower screws 41 and a pair of upper screws 42. The lower left hand screw 41 appearing in Figs 2 and 5, passes through spaced ears 43 on handle portion 32 and through a boss 44 on pedestal 23, to thus provide one point of support of the grip part on the rear end of miter gage bar 2. Another point of support is provided for the grip part 31, which is spaced forwardly from such rear point, by means of an upright stud 46 fixed to protractor body 9. The upper end of stud 46 is rotatably journalled in mating sections 37 of the grip part.

For securing the grip part to stud 46, the stud is provided with an annular recess 47 at its upper end, which forms a head 48 overlying a shoulder 49 formed in mating sections 37. Since stud 46 can turn in the grip part, free unimpeded movement of protractor body 9 is not affected. Because of spaced points of attachment of grip part 31 on the supporting base structure at one side of the work 50, great stability obtains to thus obviate creeping of the work held by the work clamping part 33 in the manner to be described more fully later.

Actuating means 35 for work clamping part 33 comprises a generally L-shaped lever 51 within the hollow interior 38 of the grip part. Lever 51 has a horizontal portion 52 pivotally mounted on the left hand upper screw 42 appearing in Fig. 5, projecting forwardly of such screw 42 to provide means for detachable but fixed connection of lever 51 with work clamping part 33 in a manner to be described. Adjacent its lower end, lever 51 engages in a slot 53 formed in a transverse key member 54 fixed on a trigger 56 mounted in handle portion 32 for floating movement; the side edges of the key 54 being freely slidably mounted in opposite guideways 57 formed on the inside faces of the respective mating sections 37. Trigger 56 projects freely through an elongated slot 58 formed by the mating sections 37 at the underside of handle portion 32, and has an elongated arcuate underface 59 extending substantially the length of handle portion 32 and which can be comfortably grasped by the four fingers of a hand to press the trigger inwardly.

Stop members 61 are provided at the upper and lower ends of the trigger, engageable with portions of the inside of handle portion 32 to preclude the described lever and trigger assembly from falling out of the handle portion. Resilient means in the form of a coil spring 62 is interposed between the inside of handle portion 32 and a spring abutment pad 63 at the lower end of lever 51 for resiliently thrusting the work clamping part 33 to non-clamping position. At one end, spring 62 is seated in a recess 64 in handle portion 32, and at the opposite end it is centered about a centering boss 66 on abutment face 63. Since grip part 31 is made of the two mating sections 37 held together by detachable screws, it is readily apparent that with lever 51, trigger 56 and spring 62 properly positioned between the parts, and the two mating sections 37 properly positioned over head 48 of stud 46, the grip part can be quickly assembled and attached to the miter gage.

From the preceding description, it is seen that when the grip part of the device is held merely by one hand and trigger 56 squeezed by the fingers of such hand, as is illustrated in Fig. 1, work clamping part 33 will be moved downwardly from the full line position shown in Fig. 5 to the dotted line position. As long as the trigger is held squeezed, the work 50 will be clamped firmly; and by mere movement of the hand forwardly, the entire miter gage with the work and the clamping device, can be moved along work table 7 so that the work can be cut by the cutting tool 8. Because spring 62 urges work clamping part 33 to non-clamping position, the work will become automatically released by mere release of the trigger by the hand.

Arm 34 of work clamping part 33 projects in cantilever fashion outwardly and forwardly from projection 52 of lever 51, and has an end recess 71 in which lever projection 52 seats with a close fit. When arm 34 is seated on lever projection 52, it is detachably but firmly held thereon by a set screw 72, and extends beyond the front of work abutment face 13 of protractor body 9.

The work engaging means 36 of the clamping part is adjustably supported on clamping arm 34 for both vertical and longitudinal adjustment. For this purpose, an elongated slot 73 is formed in arm 34, and an upright screw threaded post 74 extends freely through slot 73 so as to be longitudinally adjustable therein. Post 74 is rectangularly shaped in cross-section, as can be seen best from Fig. 3, so that it can not turn in slot 73. Vertical adjustment of post 74 relative to arm 34 is provided by means of a pair of nuts 76 screwed on the post, one above and one below the arm. By adjusting the height of nuts 76 on post 74, the distance of the bottom of the post from the work 67 can be selected so that the work engaging means can initially clear the work; and by tightening both nuts 76 against arm 71, post 74 can be fixedly held on the arm.

At its lower end, post 74 carries a work press shoe 77 which is loosely mounted on a pin 78 fixed to the post, so that the shoe may have a limited amount of universal movement to engage evenly the work when the work clamping part is brought into position to clamp the work.

Detachable mounting of arm 34 of work clamping part 33 on lever projection 52 which is a functional part of grip part 31 insofar as the mounting assembly is concerned, is an important feature. This is so because in case it is desired to operate on work which is so high that it cannot be placed against abutment face 13 without clearing clamping part 33 at its uppermost adjusted position, the entire clamping part can be quickly and easily detached and removed out of the way merely by loosening set screw 72 and pulling arm 34 off of lever projection 52. In this connection, it will be noted from Fig. 5, that when arm 34 is removed from the grip part, no portion of the grip part over bar 2 (namely the center line of the device) extends in front of abutment face 13. Consequently, work otherwise too high can be abutted against face 13 free of interference with the grip part; and the device can still be employed without the necessity of removing a multiplicity of parts and subsequently replacing them. With respect to longitudinal adjustment of post 74 on clamping arm 34, this is an important feature because when the protractor body is turned at an angle for cutting the work at an angle, the post can be moved outwardly to avoid interference with the work turned at such angle.

In operation of the device, the mounting thereof at spaced locations on the supporting base structure in back of post 74, provides a sturdy support for the device, as previously related; and when pressure is applied to clamp the work, the work will be firmly held without creeping when it is moved against the operating tool, thus insuring accuracy of the cutting or whatever other operation is being performed. When pieces of work of the same thickness are being operated upon, post 74 can be initially vertically adjusted so that shoe 77 is slightly above the work to be clamped, thus permitting ready insertion of the work under the shoe; and clamping of the work can be readily and quickly effected in the manner related above. After the work has been operated upon, it can be replaced with work of similar thickness without the necessity of having to make any adjustments whatsoever, other than release of the trigger and replacement of the work, with subsequent clamping of the replaced work. Likewise, when successive smaller pieces are to be cut from a large piece of work, no adjustments need be made, as the work can be shifted quickly as the trigger is released, and then reclamped by squeezing the trigger.

Without a clamping device of the type described, the work is usually held with both hands. With the present device, only one hand is required to clamp the work by pressing the squeeze actuating means for the clamping part; and with such hand, the work can be moved against the operating tool, thus leaving the operator free to hold the end of the work with the free hand which enhances accuracy of operation. Although the device is particularly adapted for use in combination with a miter gage instrument, the principles thereof can be employed for hold-down of any other type of work, because the entire device can be mounted in the manner described on any other type of supporting structure.

I claim:

1. A one hand operable work holding device comprising a hand grip part extending in a general upright direction and having a handle portion shaped to conform to a hand gripping the same, means adjacent both the bottom and the top of said grip part providing for support by a base structure at spaced points, a work clamping member projecting outwardly from adjacent the top of said grip part and movably connected thereto, said member being detachably mounted whereby it can be removed, actuating means supported by said grip part and including an element movable up and down and detachably connected to said member for moving said member to clamping position by said hand, and resilient means associated with said actuating means for thrusting said member to non-clamping position to effect automatic release of said member upon release of said hand from said actuating means.

2. The work holding device of claim 1 in which said actuating means comprises a lever pivotally mounted in said hand grip part and said element is a top generally horizontally extending projection of said lever on which said clamping member is detachably secured, and a trigger is movably mounted on said handle portion and connected to said lever.

3. The work holding device of claim 1 in which said actuating means comprises a lever pivotally mounted in said hand grip part and said element is a top generally horizontally extending projection of said lever on which said clamping member is detachably secured, a trigger is movably mounted on and extends along a side of said handle portion and engages said lever, and said resilient means thrusts against said lever.

4. As an article of manufacture, a one hand operable work holding device comprising an upright hand grip part, a work clamping member projecting generally horizontally from said grip part and movably connected thereto for up and down movement, an upright post having a work engaging element adjacent the bottom thereof, means adjustably mounting said post on said member for both vertical and longitudinal adjustment relative to said member, and actuating means connected to said member for moving said member.

5. As an article of manufacture, a one hand operable work holding device comprising an upright hand grip part, a work clamping member projecting generally horizontally from adjacent the top of said grip part and movably connected thereto for up and down movement, an upright post having a work engaging element adjacent the bottom thereof, said member being provided with an elongated slot extending longitudinally thereof through which said post extends freely whereby said post can be adjusted longitudinally of said member, means associated with said post and said member for clamping said post on said member in adjusted position, and actuating means connected to said member for moving said member.

6. The work holding device of claim 5 in which said post is threaded and said post clamping means comprises nuts screwed on said post above and below said member to provide for vertical adjustment of said post on said member.

7. The combination with a miter gage including a bar adapted to be slidably mounted on a work table, and a protractor body pivotally mounted on said bar and having a front work abutment face, of a one hand operable work holding device comprising a hand grip part supported by said bar at the rear of said protractor body and extending upwardly therefrom, a work clamping member projecting forwardly from adjacent the top of said grip part beyond the front of said work abutment face and movably connected to said grip part for up and down movement, means carried by said member for engaging the work, actuating means supported by said grip part and connected to said member for moving said member by said hand, and resilient means cooperating with said actuating means for automatically thrusting said member to non-clamping position upon release of said hand from said actuating means.

8. A one hand operable work holding device for mounting on a miter gage which includes a protractor body having a front work abutment face, comprising a hand grip part having a handle portion, means on said device providing for support thereof on said gage with said handle portion extending in an upright direction, hand operable actuating means supported by said grip part and including a support element adjacent the top of said grip part mounted for up and down movement, a generally horizontally extending arm supported by said element, work clamping means mounted on said arm for both vertical and longitudinal adjustment relative to said arm, and resilient means cooperating with said actuating means for effecting automatic release of said actuating means upon release of the hand therefrom.

9. A one hand operable work holding device for mounting on a miter gage which includes a protractor body having a front work abutment face, comprising a hand grip part having a handle portion, means on said device providing for support thereof on said gage with said handle portion extending in an upright direction, hand operable actuating means supported by said grip part and including a support element adjacent the top of said grip part mounted for up and down movement, a generally horizontally extending arm detachably supported by said element, work clamping means including an upright post mounted on said arm for both vertical and longitudinal adjustment relative to said arm, and resilient means cooperating with said actuating means for effecting automatic release of said actuating means upon release of the hand therefrom, said hand grip part and said arm support element being located behind said abutment face when mounted on said gage to allow high work to be abutted against said abutment face without interference when said arm is detached from said element.

10. The combination with a miter gage including a bar adapted to be slidably mounted on a work table, and a protractor body pivotally mounted on said bar and having a front work abutment face; of a one hand operable work holding device comprising a hand grip part having a handle portion supported on the rear of said gage and extending in an upright direction therefrom, means including an upright post connected to the upper part of said device providing another support therefor on said gage, hand operable actuating means supported by said grip part and including a support element adjacent the top of said grip part mounted for up and down movement, an arm detachably supported by said element and extending horizontally therefrom in cantilever fashion, work clamping means including an upright post mounted on said arm for both vertical and longitudinal adjustment relative to said arm, and resilient means cooperating with said actuating means for effecting automatic release of said actuating means upon release of the hand therefrom, said hand grip part and said arm support element being located behind said abutment face to allow high work to be abutted against said abutment face without interference when said arm is detached from said element.

11. The construction of claim 10 in which said handle portion is hollow, said actuating and resilient means are located within said handle portion, and a trigger is movably mounted on said handle portion to engage said actuating means.

References Cited in the file of this patent

UNITED STATES PATENTS

| | | |
|---|---|---|
| 260,375 | Estabrook | July 4, 1882 |
| 664,530 | Brown | Dec. 25, 1900 |
| 993,045 | Felts | May 23, 1911 |
| 1,894,010 | Tantz | Jan. 10, 1933 |
| 2,085,235 | Tantz | June 29, 1937 |
| 2,522,965 | Schufelberger | Sept. 19, 1950 |
| 2,554,730 | Chandler | May 29, 1951 |
| 2,696,852 | Dunton | Dec. 14, 1954 |

FOREIGN PATENTS

| | | |
|---|---|---|
| 4,410 | Netherlands | Dec. 15, 1919 |